(12) United States Patent
Bianchi et al.

(10) Patent No.: US 10,810,560 B2
(45) Date of Patent: Oct. 20, 2020

(54) SYSTEM AND METHOD FOR PAYMENT PROMISE TRANSFERS BASED ON PREFERENCES

(71) Applicant: International Business Machines Corporation, Armonk, NY (US)

(72) Inventors: Silvia Cristina Sardela Bianchi, San Paulo (BR); Paulo Marques Caldeira, Jr., Campinas (BR); Victor Fernandes Cavalcante, Campinas (BR); Maira Athanazio De Cerqueira Gatti, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 14/734,145

(22) Filed: Jun. 9, 2015

(65) Prior Publication Data
US 2016/0364702 A1    Dec. 15, 2016

(51) Int. Cl.
*G06Q 20/10*    (2012.01)
*G06Q 40/02*    (2012.01)
*G06Q 20/24*    (2012.01)

(52) U.S. Cl.
CPC ........... *G06Q 20/102* (2013.01); *G06Q 20/24* (2013.01); *G06Q 40/025* (2013.01)

(58) Field of Classification Search
CPC .................................................. G06Q 20/102
(Continued)

(56) References Cited

U.S. PATENT DOCUMENTS

| | | | | |
|---|---|---|---|---|
| 7,082,412 B1 * | 7/2006 | Treider | ............... | G06Q 10/087 705/28 |
| 7,353,203 B1 * | 4/2008 | Kriplani | ............... | G06Q 20/02 705/39 |

(Continued)

FOREIGN PATENT DOCUMENTS

| | | | |
|---|---|---|---|
| CN | 104240129 A | * | 12/2014 |
| CN | 104240129 B | * | 9/2017 |

(Continued)

OTHER PUBLICATIONS

Ali, R. et al.; "The economies of digital currencies"; Bank of England Quarterly Bulletin, Third Quarter; www.BankofEngland.co.uk/.../qb14q3digitalcurrencies . . . ; 2014.
(Continued)

*Primary Examiner* — Sara C Hamilton
(74) *Attorney, Agent, or Firm* — Harrington & Smith (57) ABSTRACT

A method includes electronically receiving at a user device of a second party a digital promise to pay a certain amount of money in exchange for goods or services from the second party, the digital promise to pay being generated by a user device of a first party; electronically sending a request from the user device of the second party to a user device of a third party to electronically transfer the digital promise to pay to the user device of the third party in exchange for goods or services from the third party. Sending the request includes sending at least one set of preferences defined at least by the first party. The method further includes electronically receiving at the user device of the second party from the third party one of an acceptance or a rejection of the request to transfer the digital promise to pay.

13 Claims, 9 Drawing Sheets

(58) Field of Classification Search
USPC .......................................................... 705/35
See application file for complete search history.

(56) References Cited

U.S. PATENT DOCUMENTS

| | | | |
|---|---|---|---|
| 8,065,231 B1 | 11/2011 | Loy | |
| 8,315,929 B2 | 11/2012 | Allen-Rouman et al. | |
| 8,326,769 B1 | 12/2012 | Weisman | |
| 8,412,627 B2 | 4/2013 | Allen-Rouman et al. | |
| 8,538,870 B2 | 9/2013 | Allen-Rouman et al. | |
| 2002/0032643 A1* | 3/2002 | Himmelstein | G06Q 20/382 705/37 |
| 2002/0087467 A1* | 7/2002 | Mascavage, III | G06Q 20/02 705/39 |
| 2002/0107794 A1* | 8/2002 | Furphy | G06Q 10/0875 705/40 |
| 2003/0014351 A1* | 1/2003 | Neff | G06Q 40/04 705/37 |
| 2003/0018563 A1 | 1/2003 | Kilgour et al. | |
| 2003/0033216 A1* | 2/2003 | Benshemesh | G06Q 30/06 705/26.44 |
| 2003/0093367 A1* | 5/2003 | Allen-Rouman | G06Q 20/02 705/39 |
| 2003/0126036 A1* | 7/2003 | Mascavage, III | G06Q 20/02 705/26.1 |
| 2003/0208443 A1* | 11/2003 | Mersky | G06Q 20/02 705/40 |
| 2004/0117302 A1* | 6/2004 | Weichert | G06Q 20/102 705/40 |
| 2005/0177507 A1* | 8/2005 | Bandych | G06Q 20/10 705/40 |
| 2005/0216315 A1* | 9/2005 | Andersson | G06Q 10/10 705/4 |
| 2006/0143121 A1* | 6/2006 | Treider | G06Q 20/00 705/39 |
| 2006/0173772 A1* | 8/2006 | Hayes | G06Q 40/02 705/37 |
| 2006/0224502 A1 | 10/2006 | McGowan | |
| 2007/0067236 A1* | 3/2007 | Deinhardt | G06Q 20/04 705/39 |
| 2007/0174191 A1* | 7/2007 | Keaton | G06Q 20/10 705/40 |
| 2007/0244779 A1* | 10/2007 | Wolff | G06Q 40/00 705/35 |
| 2008/0052224 A1 | 2/2008 | Parker | |
| 2008/0256004 A1* | 10/2008 | Schmitt | G06Q 40/02 705/500 |
| 2008/0270293 A1* | 10/2008 | Fortune | G06Q 10/00 705/38 |
| 2008/0294546 A1 | 11/2008 | Flannery | |
| 2009/0043678 A1* | 2/2009 | Bizri | G06Q 10/06 705/30 |
| 2009/0254477 A1* | 10/2009 | Kramer | G06Q 20/102 705/40 |
| 2009/0327010 A1* | 12/2009 | Vadhri | G06Q 20/02 705/35 |
| 2010/0325061 A1* | 12/2010 | Neff | G06O 40/04 705/36 R |
| 2011/0178934 A1* | 7/2011 | Imrey | G06Q 40/02 705/80 |
| 2011/0307373 A1 | 12/2011 | Chang | |
| 2012/0143761 A1 | 6/2012 | Doran et al. | |
| 2013/0332357 A1 | 12/2013 | Green et al. | |
| 2014/0067462 A1 | 3/2014 | Korosec et al. | |
| 2014/0258087 A1 | 9/2014 | Bargagli et al. | |
| 2014/0279505 A1 | 9/2014 | Grigg et al. | |
| 2015/0032579 A1* | 1/2015 | Jacobs | G06Q 40/00 705/26.82 |
| 2015/0324770 A1* | 11/2015 | Starikova | G06Q 20/102 705/40 |
| 2016/0117651 A1* | 4/2016 | Davis | G06Q 20/3255 705/40 |
| 2016/0117666 A1* | 4/2016 | Davis | G06Q 20/223 705/39 |

FOREIGN PATENT DOCUMENTS

| | | | | |
|---|---|---|---|---|
| EP | 1235167 A2 | * | 8/2002 | ........... G06Q 20/401 |
| JP | 11096262 A | * | 4/1999 | |
| JP | 2002109224 A | * | 4/2002 | |
| JP | 2003036359 A | * | 2/2003 | |
| JP | 2003076930 A | * | 3/2003 | |
| JP | 2004126916 A | * | 4/2004 | |
| JP | 2004318768 A | * | 11/2004 | |
| JP | 2006119783 A | * | 5/2006 | |
| WO | WO-0223421 A1 | * | 3/2002 | ........... G06Q 20/382 |
| WO | 2013049359 A1 | | 4/2013 | |
| WO | 2014018821 A2 | | 1/2014 | |

OTHER PUBLICATIONS

Ali, R. et al.; "Innovations in payment technologies and the emergence of digital currencies"; Bank of England Quarterly Bulletin; Third Quarter; www.BankofEngland.co.uk/.../qb14q3digital-currencies . . . ; 2014.

Software Patent Institute et al.; "Value Conflicts and Social Choice in Electronic Funds Transfer System Developments"; An IP.com Prior Art Database Technical Disclosure; http://ip.com/IPCOM/000129323; Sep. 15, 2005.

IPCOM000221680; "Profitable Technology Transfer through Human Managerial Effectiveness"; An IP.com Prior Art Database Technical Disclosure; http://ip.com/IPCOM/000221680; Sep. 15, 2012.

http://www.cognisaya.com/services/what-is-credit-clearing.html Cognisaya 2013-2014 (3 pages).

Robleh Ali et al., "The Economics of Digital Currencies", Quarterly Bulletin 2014 Q3.

U. Pagallo et al.; "Three Roads to P2P Systems and Their Impact on Business Practices and Ethics"; Journal of Business Ethics, vol. 90, pp. 551-564; 2009.

* cited by examiner

| Steps | Customer A | | Customer B | | Factor/Bank | |
|---|---|---|---|---|---|---|
| | Assets | Liabilities | Assets | Liabilities | Assets | Liabilities |
| 1 | + goods from B | + accounts payable | + goods to A<br>+ accounts receivable | | | |
| 2 | | | + payment from bank<br>- accounts receivable | | - payment to B<br>+ accounts receivable | |
| 3 (30 days) | - goods<br>+ payment<br>- payment to bank | - accounts payable | | | - accounts receivable<br>+ payment from A | |

| Steps | Customer A | | Customer B | | Customer C | |
|---|---|---|---|---|---|---|
| | Assets | Liabilities | Assets | Liabilities | Assets | Liabilities |
| 1 | + goods from B | + accounts payable A/B | - goods to A | | | |
| | | | + accounts receivable A/B | | | |
| 2 | | - accounts payable A/B | + goods from C | | - goods to B | |
| | | + accounts payable A/B/C | - accounts receivable A/B | | + accounts receivable A/B/C | |
| 3 (30 days) | - goods + payment | | | | | |
| | - payment to C | - accounts payable A/B/C | | | - accounts receivable A/B/C | |
| | | | | | + payment from A | |

SYSTEM AND METHOD FOR PAYMENT PROMISE TRANSFERS BASED ON PREFERENCES

TECHNICAL FIELD

The embodiments of this invention relate generally to financial transactions that are conducted electronically via one or more communication networks.

BACKGROUND

Unbanked and underbanked populations typically have access to a limited financial services portfolio and may thus typically rely instead on informal financial practices such as lending among friends, family and neighbors. Another common practice involves selling goods in exchange for a promise to pay later, e.g., in a month or more, when the customer is expected to have the money to settle the debt.

Figure 1:
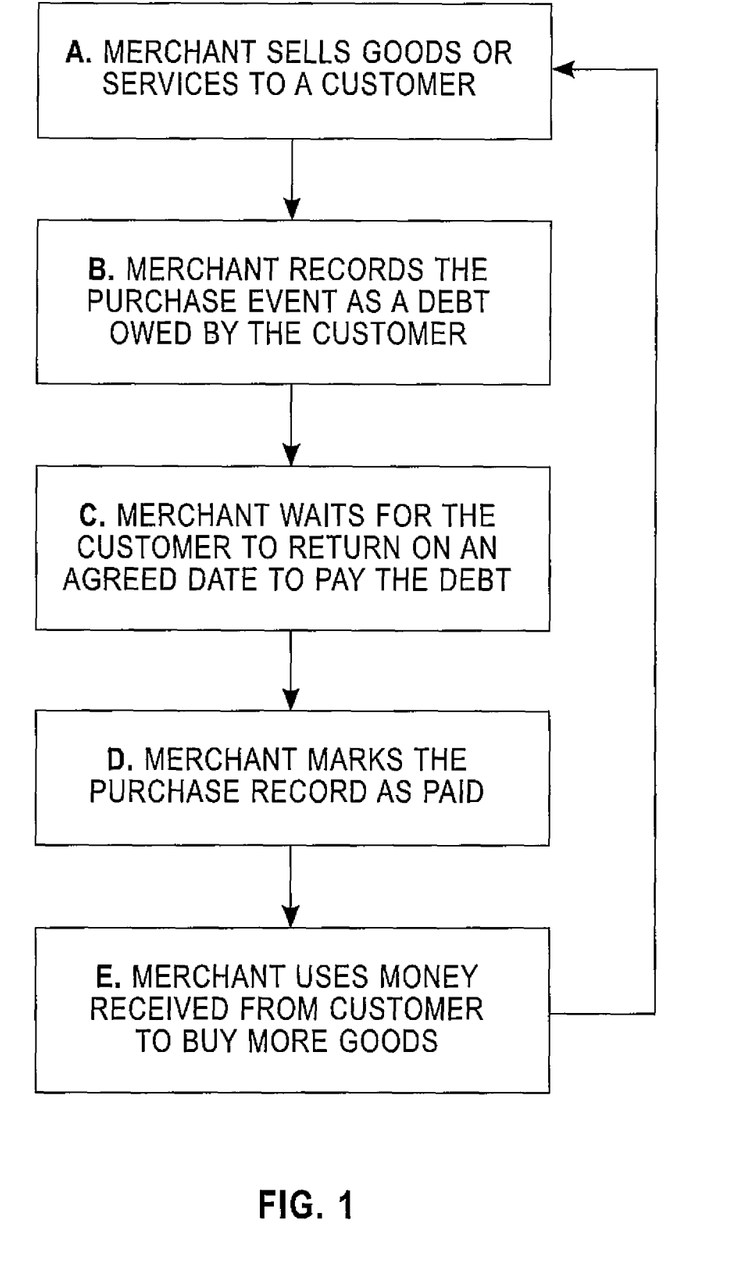
FIG. 1 shows a conventional sequence of transactions between a merchant and a customer.

In one example of such a transaction assume the following succession of events. Reference can also be made to FIG. 1.

A. A merchant sells goods or services to a customer.

B. The merchant records the purchase event, typically the customer's name, the amount to be repaid, and the date.

C. The merchant waits for the customer to return on the agreed date to pay the debt.

D. The merchant removes or otherwise marks as paid the purchase record.

E. The merchant uses the received money to buy more goods to restock the merchant's inventory.

However, if the merchant needs funds to buy more goods and supplies before the agreed-upon date to pay the debt the merchant may need to request a loan from a bank. A problem that then arises for the bank relates to the inherent difficulties in analyzing the risk of an unbanked and underbanked population. In that a significant portion of the unbanked and underbanked population do not have established credit and transaction history data, it becomes difficult for banks to evaluate their risk prior to entering into a transaction.

In view of the foregoing it should be apparent that merchants and others serving an unbanked and underbanked population could benefit from an improved financial service paradigm that better accommodates their traditional cash flow and financial practices.

SUMMARY

In a first aspect thereof the embodiments of this invention provide a method that comprises electronically receiving at a user device of a second party a digital promise to pay a certain amount of money in exchange for goods or services from the second party, the digital promise to pay being generated by a user device of a first party; electronically sending a request from the user device of the second party to a user device of a third party, the request being one to electronically transfer the digital promise to pay, that was generated by the user device of the first party, to the user device of the third party in exchange for goods or services from the third party, the sending the request to transfer to the third party the digital promise to pay comprises sending at least one set of preferences defined by at least the first party; and electronically receiving at the user device of the second party from the user device of the third party one of an acceptance or a rejection of the request to transfer the digital promise to pay that was generated by the user device of the first party.

In another aspect thereof the embodiments of this invention provide a user device comprised of at least one data processor connected with at least one memory that stores software instructions, where where execution of the software instructions by the at least one data processor causes the user device associated with a second party to perform a method that comprises electronically receiving at the user device of the second party a digital promise to pay a certain amount of money in exchange for goods or services from the second party, the digital promise to pay being generated by a user device of a first party; electronically sending a request from the user device of the second party to a user device of a third party, the request being one to electronically transfer the digital promise to pay, that was generated by the user device of the first party, to the user device of the third party in exchange for goods or services from the third party, the sending the request to transfer to the third party the digital promise to pay comprises sending at least one set of preferences defined by at least the first party; and electronically receiving at the user device of the second party from the user device of the third party one of an acceptance or a rejection of the request to transfer the digital promise to pay that was generated by the user device of the first party.

In a further aspect thereof the embodiments of this invention provide computer program product comprised of software instructions on a computer-readable medium, where execution of the software instructions using a computer results in performing operations comprising electronically receiving at a user device of a second party a digital promise to pay a certain amount of money in exchange for goods or services from the second party, the digital promise to pay being generated by a user device of a first party; electronically sending a request from the user device of the second party to a user device of a third party, the request being one to electronically transfer the digital promise to pay, that was generated by the user device of the first party, to the user device of the third party in exchange for goods or services from the third party, the sending the request to transfer to the third party the digital promise to pay comprises sending at least one set of preferences defined by at least the first party; and electronically receiving at the user device of the second party from the user device of the third party one of an acceptance or a rejection of the request to transfer the digital promise to pay that was generated by the user device of the first party.

BRIEF DESCRIPTION OF THE SEVERAL VIEWS OF THE DRAWINGS

FIG. 7 is composed of FIGS. 7A, 7B and 7C, each representing a portion of an overall method workflow, where

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

In an aspect thereof the embodiments of this invention provide a novel method and a structure to leverage informal financial transaction practices, including but not limited to payment promises, digital IOUs (a promise to pay some certain sum of money) or account receivables, in order to provide a broader range of financial services to a population through a convergence of social networks and financial life. While the population considered herein can include an unbanked or an underbanked population of persons (e.g., those having minimal and/or sporadic access to financial services), it should be appreciated at the outset that the teachings of this invention are applicable to other populations and groups of people (e.g., those not normally considered as being unbanked or underbanked) that engage in financially-related activities.

In an aspect thereof the embodiments of this invention enable users to electronically transfer payment promises to one another thereby building a credit network. The transfer, which can be considered to be a financial transaction, is based on a set of rules and/or preferences defined by an owner and receiver of a payment promise.

In an aspect thereof the embodiments of this invention also provide a system and method to electronically trade account receivables among users in exchange for a good or a service.

In another aspect thereof the embodiments of this invention extend a transfer of digital IOUs from a merchant to other merchants.

In another aspect thereof the embodiments of this invention extend and enhance conventional peer-to-peer lending systems by providing a system and method to recommend a set of digital promise-to-pay or digital IOUs based on relationship and affinity that can be transferred among users, and establish and construct an electronic payment promise transfer network where a receiver and an owner can define a set of rules or preferences for a particular transaction.

The use of the embodiments of this invention enables a user of a credit network to operate without knowing or having any personal knowledge of other users of the credit network, and provides the user the ability to define preferences and/or restrictions for transactions with those other (unknown) users.

The embodiments of this invention provide in certain aspects thereof a system and a method to electronically transfer payment promises among system users based on a set of preferences and/or rules. The user that will receive a payment promise defines a set of conditions for the owner and sender of the payment promise; and only if the conditions are satisfied the payment promise is transferred.

The use of the embodiments of this invention can assist financial institutions by including new customers from an unbanked population while increasing the scope of financial services for existing clients. The embodiments of this invention can be considered to represent an alternative to unsecured micro loans.

An aspect of this invention enables the definition of a set of rules to govern electronically transferred payment promises, where the rules can be based on, for example, geographic location, a number of prior transfers of a payment promise, transaction information, activity and personal information.

Figure 2:
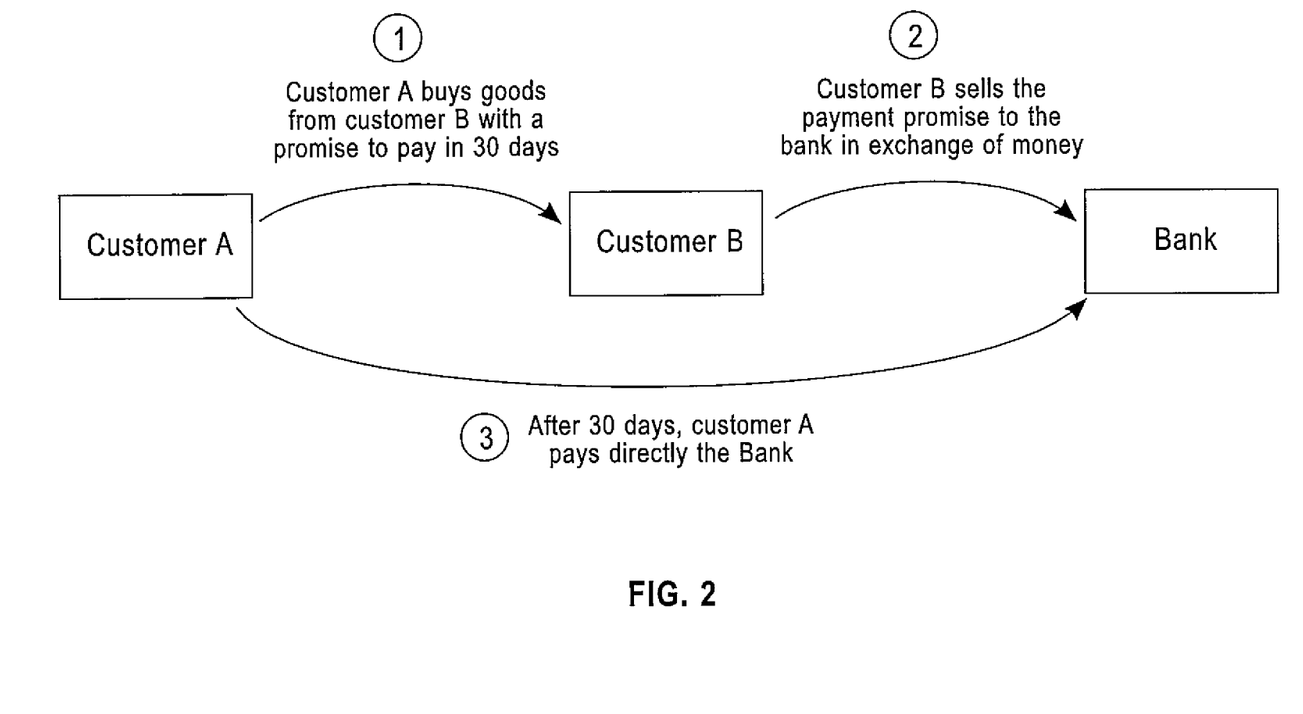
FIGS. 2 and 3 present an example of a conventional financial scenario and a balance sheet, respectively, of customers and a factor (e.g., a bank) participating in a traditional factoring transaction.
Figure 3:
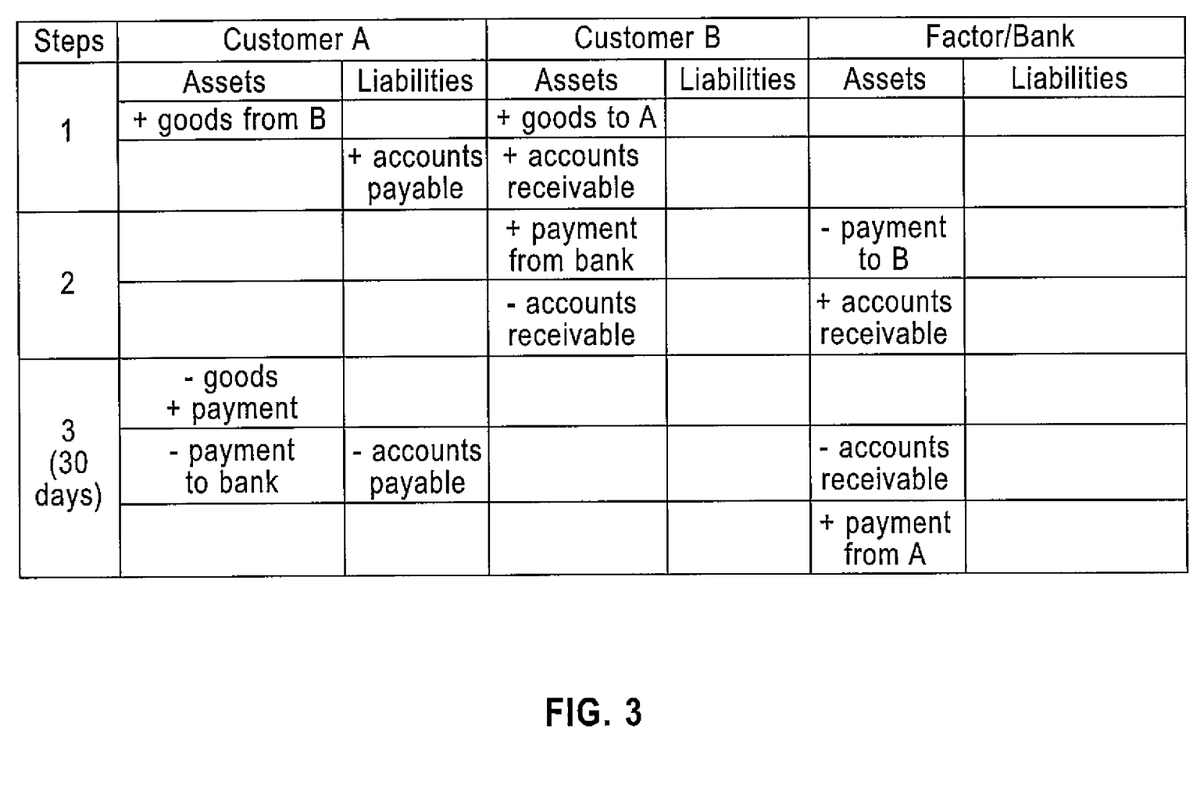

As considered herein a debtor finance transaction or factoring is a financial transaction where a merchant/business sells payment promises or account receivables or IOUs to a third party. FIGS. 2 and 3 present an example of a conventional scenario and a balance sheet, accordingly, of customers and a factor (e.g., a bank) participating in a traditional factoring transaction. At step 1 customer A buys goods from customer B on credit with a 30 day payment term (Net 30). The payment promise is represented in the balance sheet of customer A as accounts payable (liabilities side) and in the balance sheet of the customer B as accounts receivable (assets side). In order to increase cash flow, customer B sells the account receivable to a factor or a bank in exchange for cash/money. In this way, (step 2) customer B has the money and the factor or bank is waiting for the payment directly from customer A. After 30 days, when customer A receives money, for example from selling goods, customer A directly pays the factor/bank (step 3).

Figure 4:
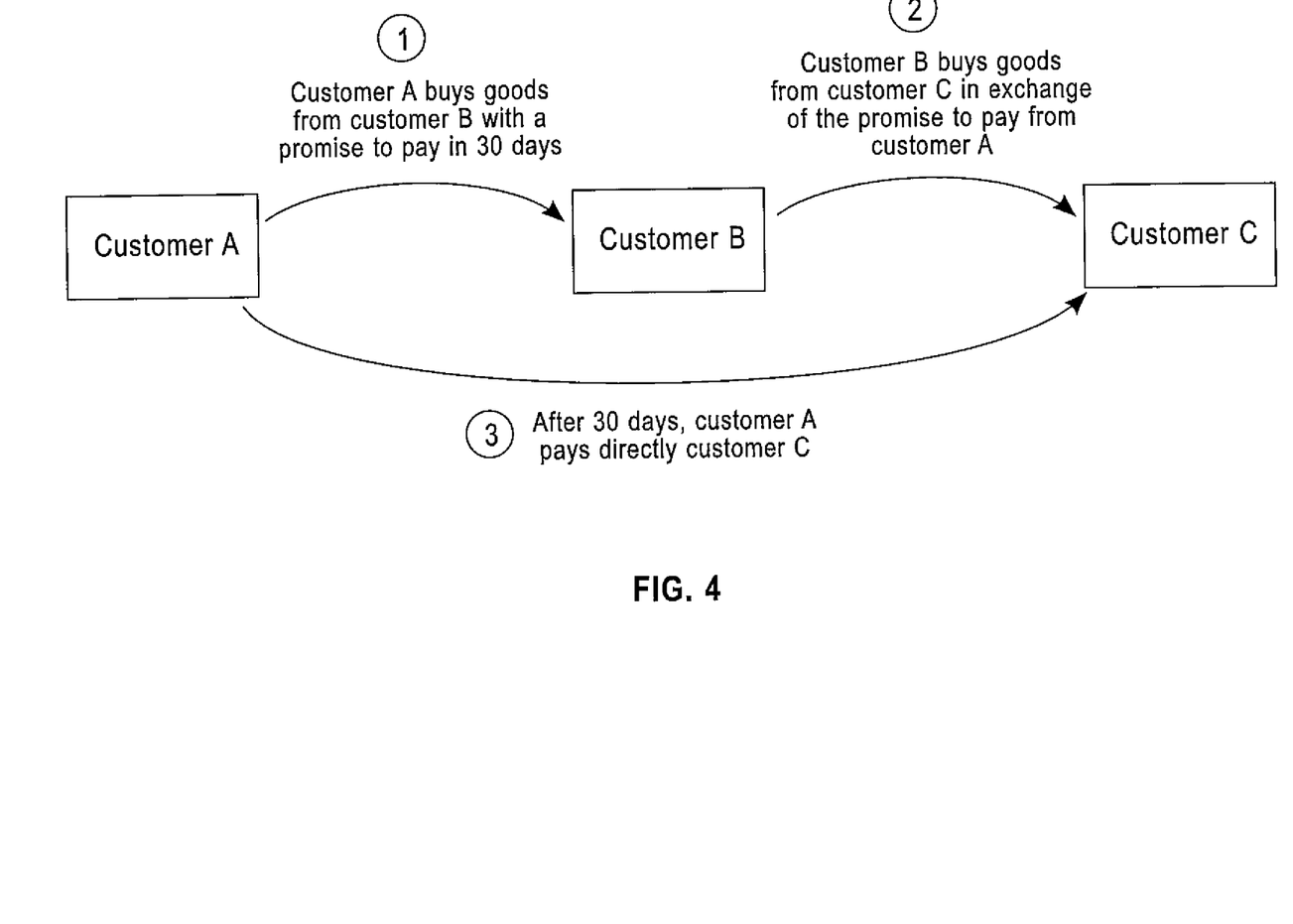
FIGS. 4 and 5 present an example of a financial scenario and a corresponding balance sheet, respectively, as considered in this invention.
Figure 5:
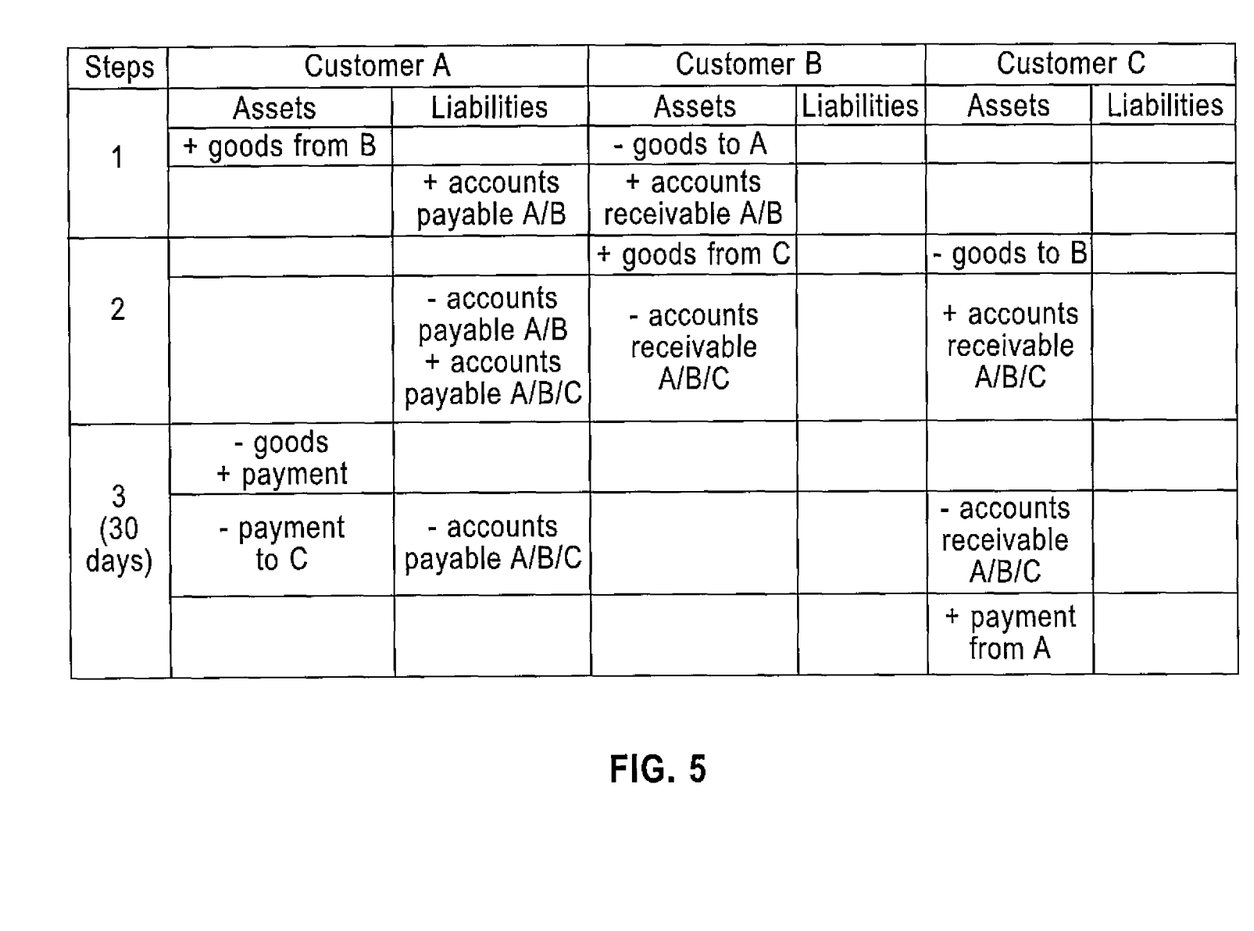

In accordance with exemplary aspects of this invention customers or merchants may exchange informal payment promises or IOUs during an exchange of goods or money. FIGS. 4 and 5 present a scenario and a corresponding balance sheet as considered in accordance with an aspect of this invention, where the customers or merchants exchange the promise to pay or informal account receivable in exchange for goods or money. At step 1 customer A buys goods from customer B on credit with a 30 day payment term (Net 30). The payment promise is represented in the balance sheet of customer A as accounts payable A/B (liabilities side) and in the balance sheet of the customer B is shown an accounts receivable A/B (assets side). At the same time or some later time, customer B buys goods from customer C (assuming for this example an equal amount and payment term). However, instead of creating a new account receivable for this transaction customer B electronically transfers to customer C the account receivable from the transaction with customer A. In this case customer C assumes the role of a factor or bank and gives goods (or money instead) in exchange for an account receivable or a promise to pay from customer A (step 2).

It should be noted that while the participating persons/merchants can be referred to herein as "customers", they can also be referred to herein interchangeably as "users" (of the system) or as "parties".

The payment promise transactions involve a degree of trust among the parties. In order to keep track of and make an accurate record of the transactions the identity of the customers are added in the account receivable (in the example: account receivable A/B/C) and in the account payable from the origin (in the example: account payable A/B/C). In this way, the system can detect any attempted fraud or misbehavior of an involved customer. After 30 days, when customer A receives money, for example from selling goods, customer A directly pays customer C as represented in step 3. In a case of there being different amounts and/or payment terms the promise to pay can be split amongst different transactions.

The embodiments of this invention provide a system and method to enable such transfers of payment promises to be based on preferences defined by the receiver of the payment promise (e.g., customer C) and/or by the (current) owner of the payment promise (e.g., customer A).

In order to accept the informal account receivable from customer A transferred to customer B, customer C preferably defines a set of rules and/or preferences that customer A and customer B should fulfil. Customer C may thus define a set of conditions, for example:
limit the amount (e.g., up to $100);
payment term (e.g., 30 days or 60 days);
purchase pattern (e.g., type of goods, service, store); and/or
number of transfers (e.g., up to a maximum of five intermediary users).

Figure 6:
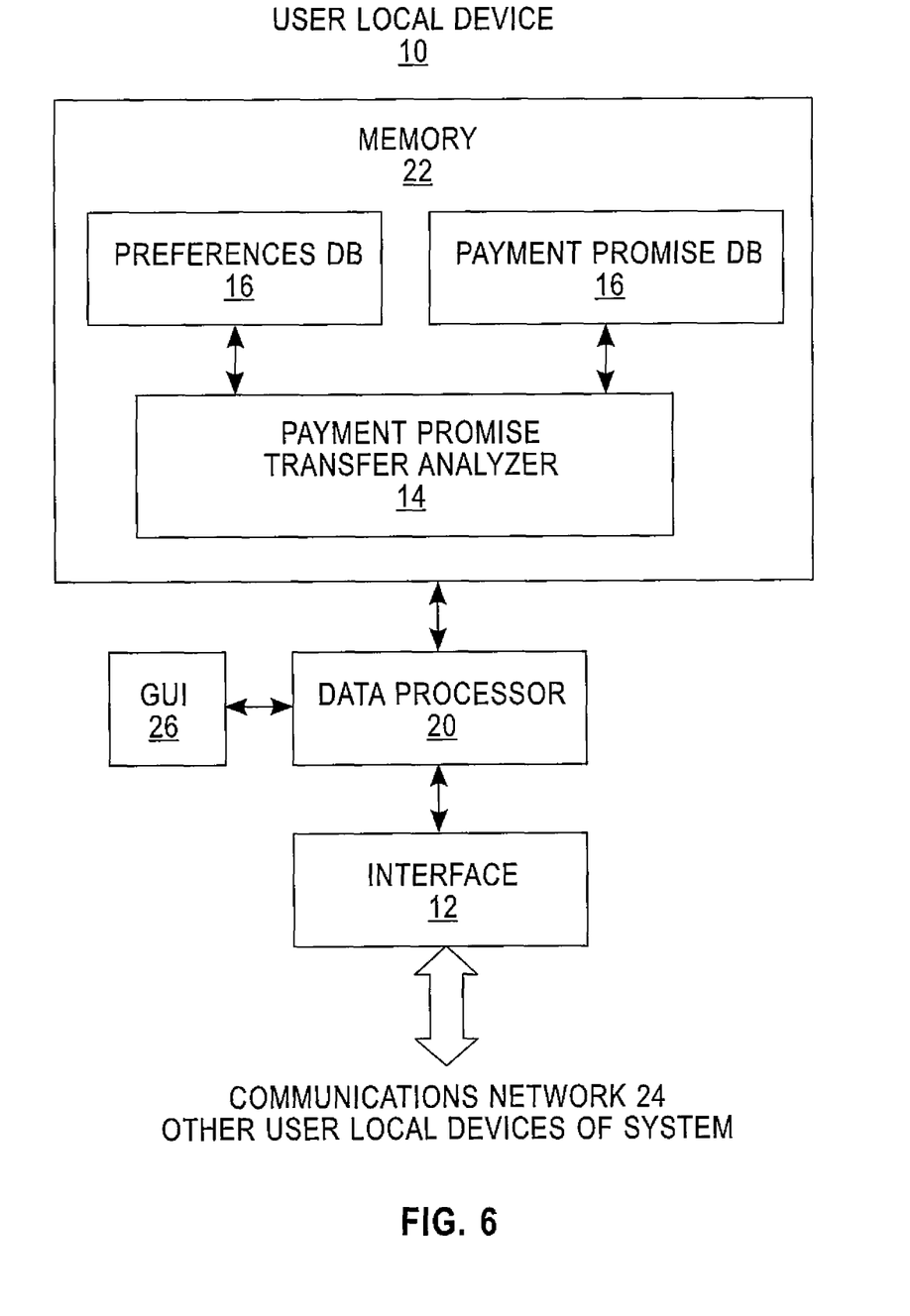
FIG. 6 is a block diagram of a system component in accordance with an aspect of this invention, where the system component can be embodied as a user local device, such as a mobile phone, and includes an interface to receive requests for payment promise transfers and to reply to such requests, a payment promise transfer analyzer, a preferences storage and a payment promises storage.

The preferences can be defined as a conjunction of predicates over attribute values:

$$S = f1 \wedge \ldots \wedge fj,$$

where fi is defined as a tuple fi=(fi opi vi) with ni the name of the attribute, opi an operator ($<, >, \leq, \geq, =, /=$, etc.), vi is a constant value, and $\wedge$ is a logical conjunction. The attributes may be numerical, string or other and the allowed values can be specified as single values or as range of values. For example, a preference expressed on the attributes a and b may be of the form $(vi<a<vj) \wedge (vk<b<vl)$. Attributes can have associated thresholds and the system generates a preference based on the attributes and thresholds for a particular user role (owner or receiver). The user validates a set of generated attributes and stores them for later use in a preferences database (DB) 16 user's local device 10 (shown in FIG. 6 and described below). A payment promise is transferred if and only if all of the attributes are satisfied.

Each attribute may have a threshold associated with it such as some maximum or minimum value or a range of values (e.g., not to exceed $20).

An exemplary (and non-limiting) list of attributes can include some or all of the following.

Geographic: e.g., geo-location of a house or a shop. Customer C may define a geographical region (e.g., street or city) where customer A lives or works. For example, customer C may prefer to perform a transaction with someone that customer C does not know only if the person (customer A in this example) lives or works in close proximity to the geo-location of where customer C lives or works.

Occupation and/or activity information: e.g., information concerning the occupation, role, company, company address, salary, education level or business activity including, for example, revenue, balance sheet or sales ledger report, credit control report, address, type of activity (retail, grocery, service), etc.

Payment promise information: amount, payment term, owner and/or the number of transfers or intermediary nodes that received the same payment promise. For example customer C may limit the maximum number of times that the informal account receivable has previously been exchanged.

Transaction information: e.g., amount spent, type of store, category of purchase, payment term.

Customer personal and financial information: information from the user such as, for example, gender, age, address, education, family information, account balance information, amount in the account, past transactions (amount spent, type of store, category of purchase), past credit history and score and pending payments history (accounts payable). Customer C may, for example, define that customer A should have some specified range of age, some minimum amount in a savings account and not have a pending payments total that exceeds some specified value.

In general, and as a non-limiting example, a set of attributes can be defined based on one or more of at least geographic location, occupation or activity, income, assets and liabilities of a party to a digital exchange of a promise to pay for a good and/or service.

A non-limiting example of a component of the overall payment system is shown in FIG. 6. The component can be, for example, the user local device 10 such as a mobile phone (e.g., a smartphone). It can be noted that the system does not require the presence of a central authority—instead it is implemented on each user's local device 10 in a distributed manner. The overall system user local devices 10 may be considered to implement a peer-to-peer, decentralized system and method to transfer payment promises such as digital IOUs among users of the system based on the predefined set of preferences/rules. The user that will receive the payment promise defines a set of conditions for the owner and sender of the payment promise; and if the conditions are satisfied the payment promise is transferred. As was explained above, the set of rules can be based on a plurality of factors including, for example, some or all of geographic location, number of transfers, transaction information, occupation and/or activity and customer personal and financial information.

The user local device 10 interacts with other user devices (components) through an interface 12 to receive requests for payment promise transfers and to reply to such requests. A received request is forwarded to a payment promise transfer analyzer 14. The payment promise transfer analyzer 14 retrieves the user's pre-established preferences from storage (e.g., the preferences database 16) and attempts to match the user's stored preferences against the received request information. The user's payment promises that are received from other users are stored in another portion of storage such as in a payment promises database 18. Before transferring a payment promise from the user of the user local device 10 the payment promise transfer analyzer 14 adds the user's identification (e.g., a digital signature of some type) to the payment promise being sent to another user of the system.

The payment promise transfer analyzer 14 can be embodied as an application program executed by a data processor 20 of the user's local device 10, and the databases 16 and 18 can be implemented using any suitable fixed or removable user device memory 22. The memory 22 can be realized with one or more memory components of the same of differing type such as, for example, or more of local RAM, Flash memory, disk memory, etc. The application program that implements the payment promise transfer analyzer 14 can be stored in the memory 22 as well.

The interface 12 can include the necessary wireless circuitry and drivers (e.g., cellular circuitry, WLAN circuitry and/or Bluetooth circuitry) to communication to and from the user local device 10 and thus connect the device 10 to other user devices 10 over an external communications network 24.

The user local device 10 may also include some type of graphical user interface (GUI) 24 such as a visual display to enable the user to visualize a transaction, and some type of data entry device, such as a touch screen or a keypad, to enter information such as preferences and transaction requests and acceptances.

While the device 10 can be a user's mobile communication device (e.g., smartphone) in other embodiments the device 10 could be realized by, as non-limiting examples, a tablet-type device, or by a laptop computer, or by a desktop computer (e.g., a PC). In general the device 10 can be any type of communication-capable (wireless and/or wired) device that includes at least one data processor 20 and the memory 22 for storing at least one application program that embodies the system payment application program and related data (e.g., preferences and payment promises/records).

A cellular communication network or networks in combination with the Internet is but one exemplary instantiation of the communications network 24 to which the user local device 10 can be inter-connected with other ones of the devices 10 in order to practice a method in accordance with the embodiments of this invention.

It should thus be realized that there is no requirement for any geo-locality between the various user devices 10, for example customers A, B and C could each be located in the same town, or village, or province, or region, or country, or they could each be located in different countries and on different continents.

The various references in this description of sending, receiving and replying to an "electronic request" are assumed to be accomplished by a user's local device 10 in concert with other user's local devices 10 and thus are implemented by operation of the communications devices involved, including the resident data processors, memories, software and interfaces. That is, direct inter-personal communications need not involved, but only or primarily wireless and/or wired communications between user local devices 10 that are controlled by the individual users.

Described now is an example of a method for defining preferences and thus populating the preferences database 16.

1. For each user with a role (an owner of a payment promise and/or a receiver of a payment promise) and for a combined set of attributes with thresholds:
   1.1 generate a preference based on the attributes and thresholds for that specific user role (owner or receiver); and
   1.2 store the preference in the database 16.

Described now is an example of a method running in the sender (or customer B in the example given above) device 10.

1. Send an electronic request to transfer a promise to pay to the receiver (customer C in this example) containing the promise to pay information (e.g., amount, payment term, owner (customer A), a list of intermediary users (if any) and the preferences set by the owner) and an identification of the sender (customer B).

2. Wait for a response from the receiver.

3. If the receiver has sent a list of attributes then send profile information associated with the list of attributes.

4. Upon receiving an approval notification from the receiver;
   4.1 if the amount of the promise to pay>user's debt to the receiver then
      4.1.1 split the promise to pay, where a promise to pay will be transferred containing the amount of the debt and another promise to pay with the remaining amount is stored locally.
   4.2 Add the user's (customer B in this example) identification in the promise to pay;
   4.3 transfer the new (revised and updated) promise to pay to the receiver; and
   4.3 send a notification to the owner (customer A in this example) that the receiver (customer C in this example) now has (owns) customer A's payment promise and, in the case of a split, that the sender (Customer B) still also has a (portion) of the promise to pay.

Described now is an example of a method running in the receiver (or customer C in the example given above) device 10.

1. Receive a request from the sender (customer B in this example) to transfer a promise to pay containing, as non-limiting examples, an amount, a payment term, an identification of the owner (customer A in this example), a list of intermediary users (if any), and any preferences set by the owner.

2. If there are preferences defined for the sender in the form $(vi<a<vj) \wedge (vk<b<vl)$:
   2.1 send a request to the sender containing the attributes for the preference.

3. If the attributes for the preferences set by the owner (if present) are satisfied and if the attributes for preferences set by the receiver (if present) are satisfied:
   3.1 confirm the transaction and send an approval notification to the sender.

4. Else if one or both of the attributes for the preferences set by the owner are not satisfied and the attributes for preferences set by the receiver are not satisfied:
   4.1. send a reject notification to the sender (customer B in this example) thereby expressly indicating that the receiver (customer C in this example) is not willing to accept the transaction (the payment promise), or alternatively make a request for additional information from the sender. If a rejection is received the sender could attempt to contact another receiver in order to transfer the promise to pay and possibly receive goods or services in return.

The various methods running in the various devices 10 as discussed above can be assumed to be implemented with computer software, e.g., an application program or programs, stored in a computer-readable memory of a device (e.g., in a memory of a smartphone) and executed by at least one data processor in cooperation with any required wireless/wired network and user interfaces.

Figure 7A:
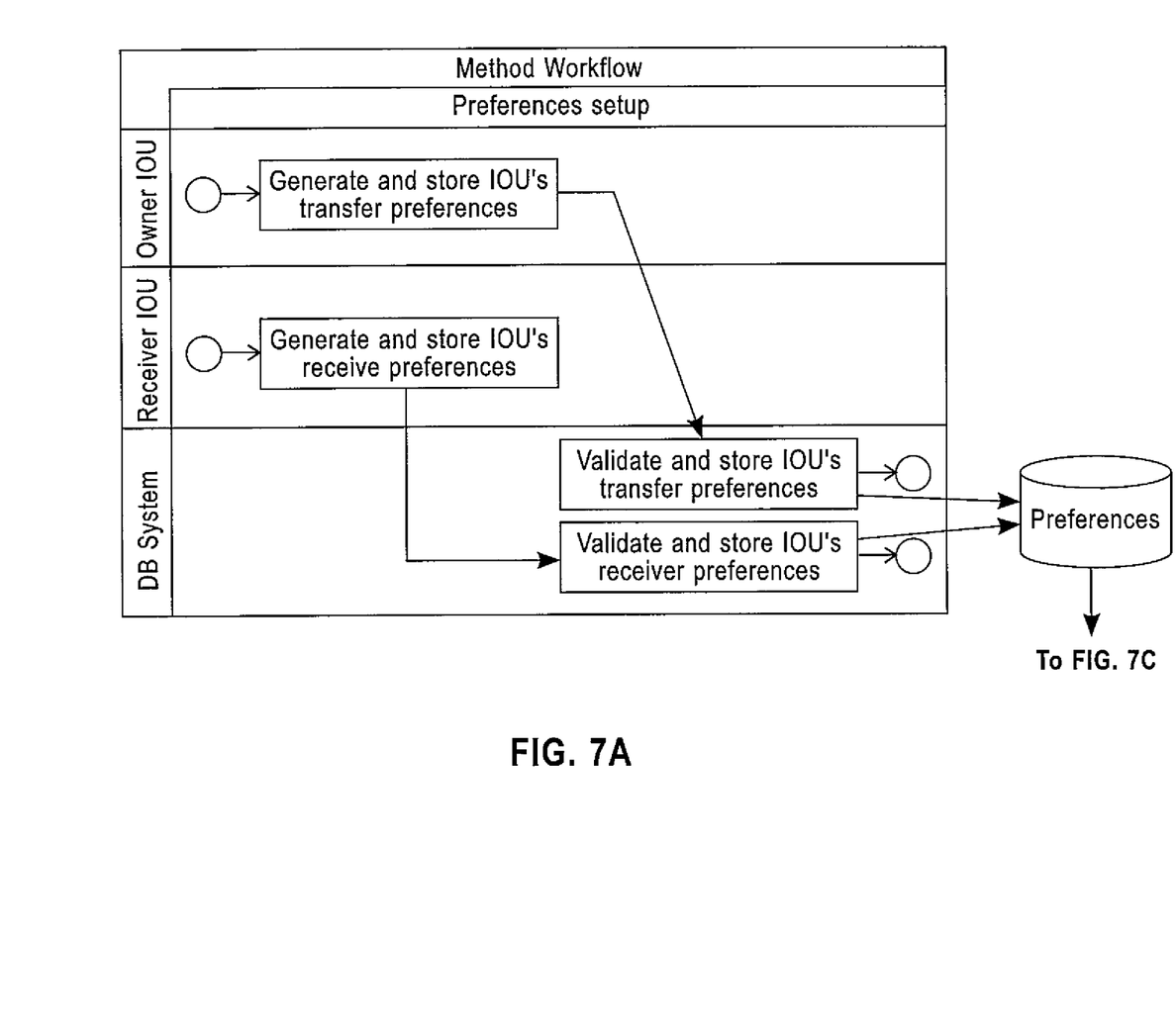
FIG. 7A shows a preferences setup workflow.
Figure 7B:
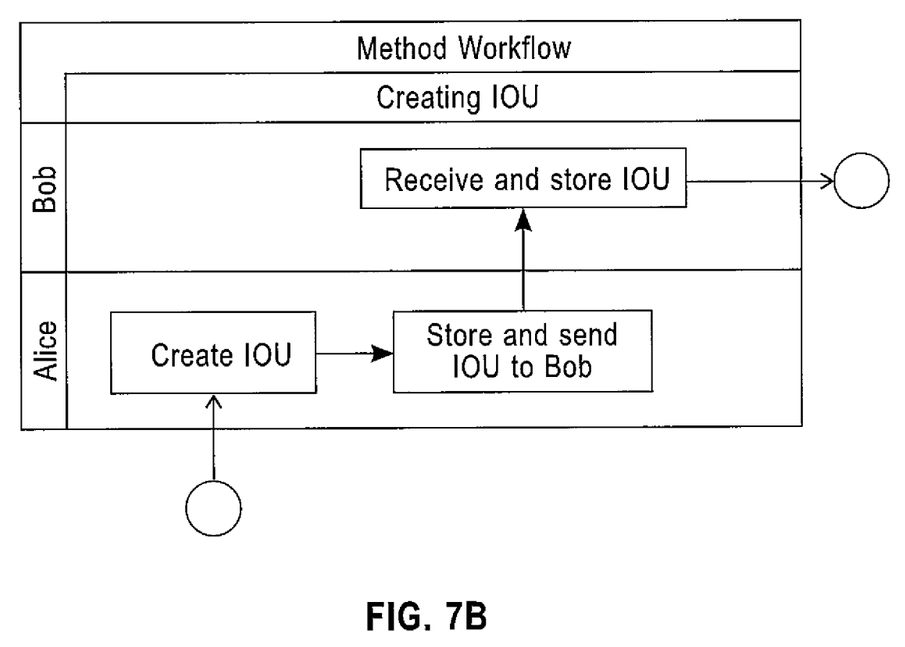
FIG. 7B shows a creation of a digital IOU workflow.
Figure 7C:
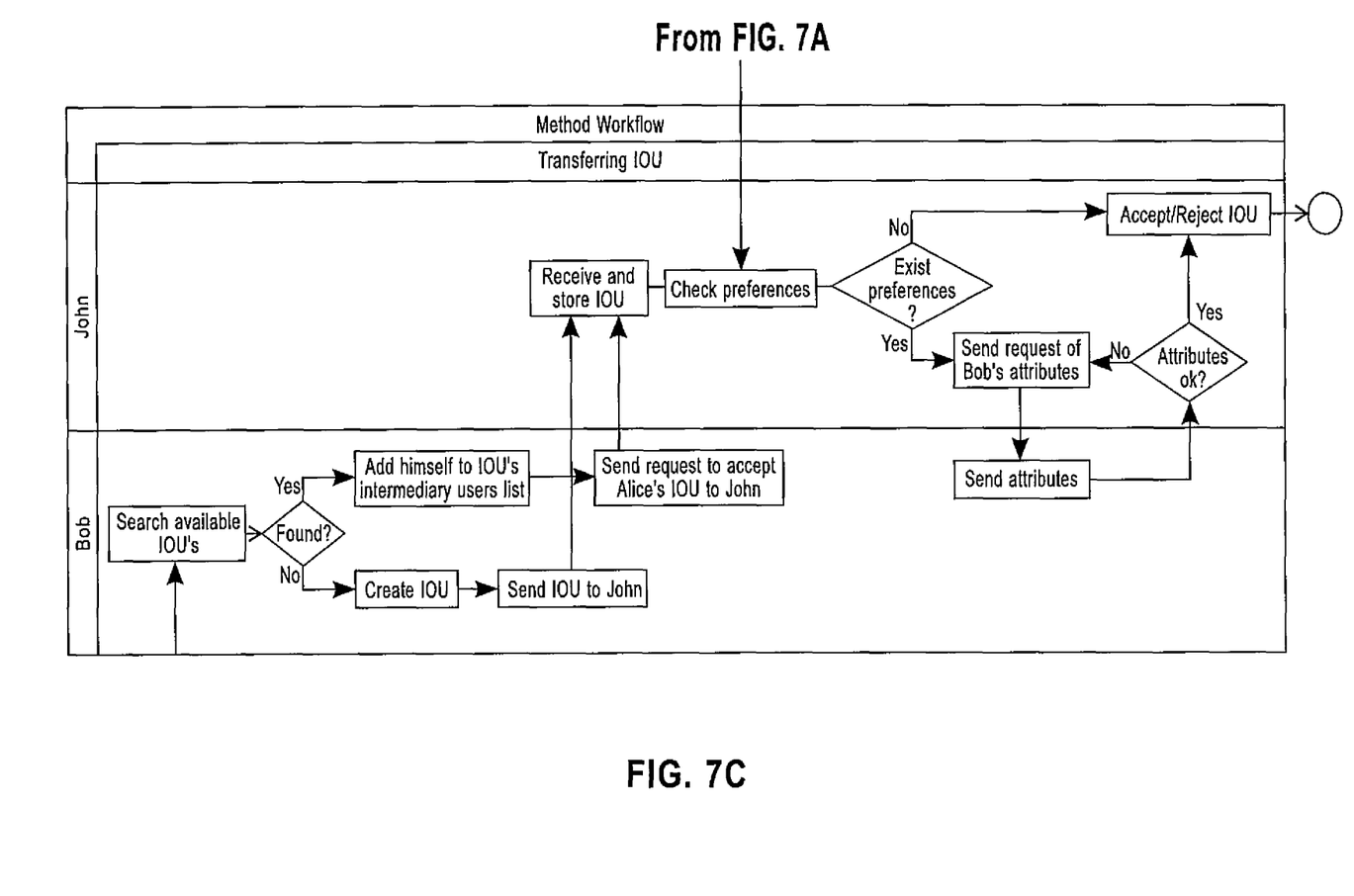
FIG. 7C shows a workflow of transferring the digital IOU created during the workflow of FIG. 7C.

FIG. 7 is composed of FIGS. 7A, 7B and 7C, each representing a portion of an overall method workflow.

In the workflow of FIG. 7A there is shown a preferences setup procedure in the user local device 10 for the user's role of an owner of an IOU and for the user's role of a receiver of an IOU. For the owner preferences setup there are generated IOU transfer preferences while for the receiver preferences setup there are generated IOU receive preferences. Prior to storage in the preferences DB 16 the database system of the user device 10 can validate the accuracy and integrity of the transfer and receiver preferences.

In the workflow of FIG. 7B there is shown a process for creating an IOU. This workflow assumes the presence of two users, Alice and Bob, where Alice creates the IOU, stores it locally in her device 10 (e.g., in payment promises DB 18) and transfers the created IOU to Bob who receives and accepts the IOU and stores it in his payment promises DB 18.

In the workflow of FIG. 7C there is shown a process for transferring an IOU. This workflow assumes the presence of two users, Bob and John, where Bob may have previously received and stored Alice's digital IOU (FIG. 7B). When Bob has a need to obtain some good or service from John his device 10 is used to search for any available IOUs in the payment promise DB 18. If none are found Bob simply creates a digital IOU (as Alice did in FIG. 7B) and transfers it to John. Assume for this example that Bob finds Alice's digital IOU. In this case Bob's device 10 adds his identification to the list of intermediary users (owners of) Alice's digital IOU and sends a request to John to accept Alice's IOU. After receiving and storing the request John's device 10 checks the attributes of Alice's IOU against the preferences DB 16. If there are no preferences stored a decision is made to accept or reject Alice's IOU. If the preferences exist John's device 10 can send a request to Bob's device 10 for a list of Bob's attributes which, when sent and received, are checked. If the attributes are found to acceptable then the decision is made whether to accept or reject Alice's IOU. If the attributes are not satisfactory then another request for additional information from Bob's device 10 can be made until either John's device 10 is satisfied or the offer to accept Alice's IOU is rejected by John's device 10.

The embodiments of this invention pertain to, at least in part, a digital IOU, or promise to pay, or debt transfer system that includes a plurality of the local devices 10 connected to the communications network 24. In the system there is a first party connected to a second party that generates a digital IOU and electronically transfers the digital IOU to the second party in exchange for a good or a service. The system also includes the second party connected to a third party, where the second party electronically sends a request to the third party to transfer the first party generated digital IOU to the third party in exchange for a good or a service. The transfer to the third party of the digital IOU is based on at least one set of preferences defined by the owner of the digital IOU and by the receiver of the digital IOU, where at least one set of preferences can be electronically transferred between devices as a part of an offer and acceptance or offer and rejection interaction.

In the system the preferences are defined as rules comprising a Boolean expression with one or more combinations of threshold levels of attributes. In the system the set of attributes are defined based on one or more of geographic location, occupation or activity (e.g., role, company, company address, salary, education level or business activity: revenue, balance sheet or sales ledger report, credit control report, address, type of activity), digital IOU information (e.g., amount, payment term, owner, number of transfers or intermediary nodes that received the payment promise), transaction information (such as amount spent, type of store, category of purchase and payment term), and customer or business personal and financial information (e.g., gender, age, address, education, family information, business information, account balance information, amount in the account, past transactions history, past credit history and score and pending payments history).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts, workflows and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A method for using a user device of a second party operating in a distributed, peer-to-peer network comprising a plurality of user devices transferring digital promises to pay, wherein the plurality of user devices include a user device of a first party, the user device of the second party, and a user device of a third party, said method comprising:

establishing on the user device of the second party, a peer-to-peer application for transferring digital promises to pay and through execution of the peer-to-peer application by the user device of the second party:

electronically receiving, by the user device of the second party from the user device of the first party, a digital promise to pay a certain amount of money in exchange for goods or services from the second party, wherein the digital promise to pay was generated by the user device of the first party, electronically sending a request, by the user device of the second party to the user device of the third party, the request being one to electronically transfer the digital promise to pay, that was generated by the user device of the first party, to the user device of the third party in exchange for goods or services from the third party, the electronically sending the request to electronically transfer the digital promise to pay comprising sending at least one set of preferences defined by at least the first party;

electronically receiving, by the user device of the second party from the user device of the third party, one of an acceptance or a rejection of the request to electronically transfer the digital promise to pay that was generated by the user device of the first party, where in response to the user device of the second party electronically receiving an acceptance of the request to electronically transfer the digital promise to pay, determining, by the user device of the second party, whether an amount owed by the second party to the third party for the goods or services is less than the certain amount of money of the digital promise to pay that was generated by the first party, and, when the amount owed by the second party to the third party for the goods or services is less than the certain amount of money of the digital promise to pay that was generated by the first party, splitting, by the user device of the second party, the digital promise to pay by:

transferring, by the user device of the second party to the user device of the third party, a first digital promise to pay for the amount owed, retaining, by the user device of the second party, a second digital promise to pay representing a difference between the certain amount and the amount owed to the third party, and electronically notifying the first party that the third party now owns a portion of the digital promise to pay and that the second party owns a remaining portion of the digital promise to pay.

2. The method as in claim 1, where a set of attributes are defined based on one or more of at least geographic location, occupation or activity, income, assets and liabilities of the first party.

3. The method of claim 1, where the digital promise to pay that is electronically received by the user device of the second party comprises an identification of the first party and an identification of any intermediate parties that have previously electronically received and transferred the digital promise to pay.

4. The method of claim 3, where a preference of the at least one set of preferences defined by the first party specifies a maximum number of times that the digital promise to pay can be electronically transferred between parties.

5. The method of claim 1, where the request to electronically transfer the digital promise to pay is accepted only when attributes for the at least one set of preferences defined by the first party are satisfied and when attributes for at least one set of preferences defined by the third party are satisfied.

6. A user device of a second party operating in a distributed, peer-to-peer network comprising a plurality of user devices transferring digital promises to pay, wherein the plurality of user devices include a user device of a first party, the user device of the second party, and a user device of a third party, said user device of the second party comprising:
at least one memory that stores software instructions; and
at least one data processor connected with said at least one memory, wherein the at least one data processor upon execution of software instructions performs steps comprising:
establishing on the user device of the second party, a peer-to-peer application for transferring digital promises to pay and through execution of the peer-to-peer application:
electronically receiving from the user device of the first party, a digital promise to pay a certain amount of money in exchange for goods or services from the second party, wherein the digital promise to pay was generated by the user device of the first party;
electronically sending a request to the user device of the third party, the request being one to electronically transfer the digital promise to pay, that was generated by the user device of the first party, to the user device of the third party in exchange for goods or services from the third party, the electronically sending the request to electronically transfer the digital promise to pay comprising sending at least one set of preferences defined by at least the first party,
electronically receiving from the user device of the third party, one of an acceptance or a rejection of the request to electronically transfer the digital promise to pay that was generated by the user device of the first party, where in response to electronically receiving an acceptance of the request to electronically transfer the digital promise to pay,
determining whether an amount owed by the second party to the third party for the goods or services is less than the certain amount of money of the digital promise to pay that was generated by the first party and, when the amount owed by the second party to the third party for the goods or services is less than the certain amount of money of the digital promise to pay that was generated by the first party, splitting the digital promise to pay by:
transferring, to the user device of the third party, a first digital promise to pay for the amount owed, retaining a second digital promise to pay representing a difference between the certain amount and the amount owed to the third party, and electronically notifying the first party that the third party now owns a portion of the digital promise to pay and that the second party owns a remaining portion of the digital promise to pay.

7. The user device as in claim 6, where attributes have associated thresholds and where a preference of the at least one set of preferences is generated based on attributes and thresholds for a particular role assumed by a party, where the role comprises one of an owner of a digital promise to pay who generates the digital promise to pay, and a receiver of a digital promise to pay.

8. The user device as in claim 7, where a set of attributes are defined based on one or more of at least geographic location, occupation or activity, income, assets and liabilities of the first party.

9. The user device as in claim 6, where the digital promise to pay that is electronically received comprises an identification of the first party and an identification of any intermediate parties that have previously electronically received and transferred the digital promise to pay.

10. The user device as in claim 6, where the request to electronically transfer the digital promise to pay is accepted only when attributes for the at least one set of preferences defined by the first party are satisfied and when attributes for at least one set of preferences defined by the third party are satisfied.

11. A computer program product comprising a non-transitory computer-readable medium having software instructions stored thereon, said software instructions when executed by a user device of a second party operating in a distributed, peer-to-peer network comprising a plurality of user devices transferring digital promises to pay, wherein the plurality of user devices include a user device of a first party, the user device of the second party, and a user device of a third party performs operations comprising:
establishing on the user device of the second party, a peer-to-peer application for transferring digital promises to pay and through execution of the peer-to-peer application:
electronically receiving from the user device of the first party, a digital promise to pay a certain amount of money in exchange for goods or services from the second party, wherein the digital promise to pay was generated by the user device of the first party;
electronically sending a request to the user device of the third party, the request being one to electronically transfer the digital promise to pay, that was generated by the user device of the first party, to the user device of the third party in exchange for goods or services from the third party, the electronically sending the request to electronically transfer the digital promise to pay comprising sending at least one set of preferences defined by at least the first party,
electronically receiving from the user device of the third party, one of an acceptance or a rejection of the request to electronically transfer the digital promise to pay that was generated by the user device of the first party, where in response to electronically receiving an acceptance of the request to electronically transfer the digital promise to pay,
determining whether an amount owed by the second party to the third party for the goods or services is less than the certain amount of money of the digital promise to pay that was generated by the first party and, when the amount owed by the second party to the third party for the goods or services is less than the certain amount of money of the digital promise to pay that was generated by the first party, splitting the digital promise to pay by:
transferring, to the user device of the third party, a first digital promise to pay for the amount owed, retaining a second digital promise to pay representing a difference between the certain amount and the amount owed to the third party, and electronically notifying the first party that the third party now owns a portion of the digital promise to pay and that the second party owns a remaining portion of the digital promise to pay.

12. The computer program product as in claim 11, where a preference is generated based on attributes and thresholds for a particular role assumed by a party, where the role comprises one of an owner of a digital promise to pay who generates the digital promise to pay, and a receiver of a digital promise to pay, and where a set of attributes are defined based on one or more of at least geographic location, occupation or activity, income, assets and liabilities of the first party.

13. The computer program product as in claim 11, where the digital promise to pay that is electronically received comprises an identification of the first party and an identification of any intermediate parties that have previously electronically received and transferred the digital promise to pay, and where a preference of the first party specifies a maximum number of times that the digital promise to pay can be transferred between parties.

* * * * *